(12) United States Patent
Na et al.

(10) Patent No.: US 9,360,601 B2
(45) Date of Patent: Jun. 7, 2016

(54) ON-CHIP DIFFRACTION GRATING PREPARED BY CRYSTALLOGRAPHIC WET-ETCH

(71) Applicant: Intel Corporation, Santa Clara, CA (US)

(72) Inventors: Yun-Chung Na, Palo Alto, CA (US); John Heck, Berkeley, CA (US); Haisheng Rong, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/635,912

(22) Filed: Mar. 2, 2015

(65) Prior Publication Data

US 2015/0185377 A1   Jul. 2, 2015

Related U.S. Application Data

(63) Continuation of application No. 13/075,422, filed on Mar. 30, 2011, now Pat. No. 8,970,956.

(51) Int. Cl.
*B44C 1/22* (2006.01)
*G02B 5/18* (2006.01)
*G02B 6/02* (2006.01)

(52) U.S. Cl.
CPC ............ *G02B 5/1857* (2013.01); *G02B 5/1842* (2013.01); *G02B 5/1861* (2013.01); *G02B 6/02009* (2013.01)

(58) Field of Classification Search
CPC ............ H01L 21/306; H01L 21/30608; H01L 21/30604; H01L 21/30617; G02B 5/1857; G02B 5/1847; G02B 5/1861; G02B 5/1842; G02B 5/1866; G02B 5/1801

USPC ............ 216/83, 95, 97, 99, 103, 108, 92; 438/745, 750, 753

See application file for complete search history.

(56) References Cited

U.S. PATENT DOCUMENTS

| 4,405,405 | A | 9/1983 | Fujii et al. |
| 6,517,734 | B1 | 2/2003 | Muller et al. |
| 8,331,027 | B2 * | 12/2012 | Padmore ............ B29D 11/0073 356/328 |
| 8,442,374 | B2 * | 5/2013 | Chang-Hasnain ..... B82Y 20/00 385/129 |
| 8,970,956 | B2 | 3/2015 | Na et al. |
| 2002/0196546 | A1 * | 12/2002 | Fabiny ................. G02B 5/1861 359/571 |

(Continued)

FOREIGN PATENT DOCUMENTS

| CN | 1396494 | 2/2003 |
| CN | 1576778 | 2/2005 |

(Continued)

OTHER PUBLICATIONS

Restriction Requirement in U.S. Appl. No. 13/075,422 mailed on Jun. 12, 2013.

(Continued)

*Primary Examiner* — Lan Vinh
(74) *Attorney, Agent, or Firm* — Patent Capital Group (57) ABSTRACT

Methods of forming microelectronic structures are described. Embodiments of those methods may include forming a photomask on a (110) silicon wafer substrate, wherein the photomask comprises a periodic array of parallelogram openings, and then performing a timed wet etch on the (110) silicon wafer substrate to form a diffraction grating structure that is etched into the (110) silicon wafer substrate.

19 Claims, 9 Drawing Sheets

(56) References Cited

U.S. PATENT DOCUMENTS

| | | | |
|---|---|---|---|
| 2003/0206688 A1* | 11/2003 | Hollars | G02B 6/2938 385/24 |
| 2003/0231692 A1* | 12/2003 | Belikov | G02B 5/1828 372/102 |
| 2004/0029304 A1 | 2/2004 | Naydenkov et al. | |
| 2008/0230947 A1* | 9/2008 | Chou | B29C 33/60 264/225 |
| 2010/0266240 A1 | 10/2010 | Krishnamoorthy et al. | |
| 2010/0327424 A1 | 12/2010 | Braunisch et al. | |
| 2012/0250157 A1 | 10/2012 | Na et al. | |

FOREIGN PATENT DOCUMENTS

| | | |
|---|---|---|
| JP | 2010-102008 | 5/2010 |
| KR | 10-0169836 | 4/1999 |
| WO | WO 2013/106008 | 7/2013 |

OTHER PUBLICATIONS

Non-Final Office Action in U.S. Appl. No. 13/075,422 mailed on Aug. 28, 2013.

Final Office Action in U.S. Appl. No. 13/075,422 mailed on Mar. 21, 2014.

Notice of Allowance in U.S. Appl. No. 13/075,422 Oct. 16, 2014.

PCT International Search Report and Written Opinion in PCT International Application Serial No. PCT/US2012/030759 mailed on Jul. 25, 2013.

PCT International Preliminary Report on Patentability in PCT International Application Serial No. PCT/US2012/030759 dated Oct. 02, 2013.

State Intellectual Property Office of China Notice on the First Office Action in Chinese Patent Application Serial No. 201280016352.5 mailed on Feb. 27, 2015.

* cited by examiner

ON-CHIP DIFFRACTION GRATING PREPARED BY CRYSTALLOGRAPHIC WET-ETCH

CROSS-REFERENCE TO RELATED APPLICATIONS

This Application is a continuation (and claims the benefit of priority under 35 U.S.C. §120) of U.S. patent application Ser. No. 13/075,422 filed on Mar. 30, 2011 and entitled ON-CHIP DIFFRACTION GRATING PREPARED BY CRYSTALLOGRAPHIC WET-ETCH. The disclosure of the prior Application is considered part of and is incorporated by reference in the disclosure of this Application.

GOVERNMENT INTEREST STATEMENT

This invention was made with Government support under H98230-08-3-0011 awarded by Department of Defense. The Government has certain rights in this invention.

BACKGROUND

A Diffraction gratings (DG) is an important optical devices widely used in applications where dispersing wavelengths are required. In free space optics, DG's are usually fabricated by either mechanically burnishing the grooves onto a substrate, or by reactive ion beam etching the holographic pattern developed by two beam interference. In waveguide optics, DG's have been fabricated by utilizing standard photolithographic and etching techniques.

BRIEF DESCRIPTION OF THE DRAWINGS

While the specification concludes with claims particularly pointing out and distinctly claiming certain embodiments, the advantages of the various embodiments can be more readily ascertained from the following description of the embodiments when read in conjunction with the accompanying drawings in which:

DETAILED DESCRIPTION

In the following detailed description, reference is made to the accompanying drawings that show, by way of illustration, the specific embodiments which may be practiced. These embodiments are described in sufficient detail to enable those skilled in the art to practice the embodiments. It is to be understood that the various embodiments, although different, are not necessarily mutually exclusive. For example, a particular feature, structure, or characteristic described herein, in connection with one embodiment, may be implemented within other embodiments without departing from their spirit and scope. In addition, it is to be understood that the location or arrangement of individual elements within each disclosed embodiment may be modified without departing from their spirit and scope. The following detailed description is, therefore, not to be taken in a limiting sense, and the scope of the embodiments is defined only by the appended claims, appropriately interpreted, along with the full range of equivalents to which the claims are entitled. In the drawings, like numerals refer to the same or similar functionality throughout the several views.

Methods and associated structures of forming and utilizing microelectronic structures, such as a diffraction grating structures, are described. Those methods and structures may include forming a photomask on a (110) silicon wafer substrate, wherein the photomask comprises a periodic array of parallelogram openings, and then performing a timed wet etch on the (110) silicon wafer substrate to form a diffraction grating structure that is etched into the (110) silicon wafer substrate. Various embodiments described herein enable the fabrication of plane diffraction gratings comprising ultra high optical qualities.

Figure 1A:
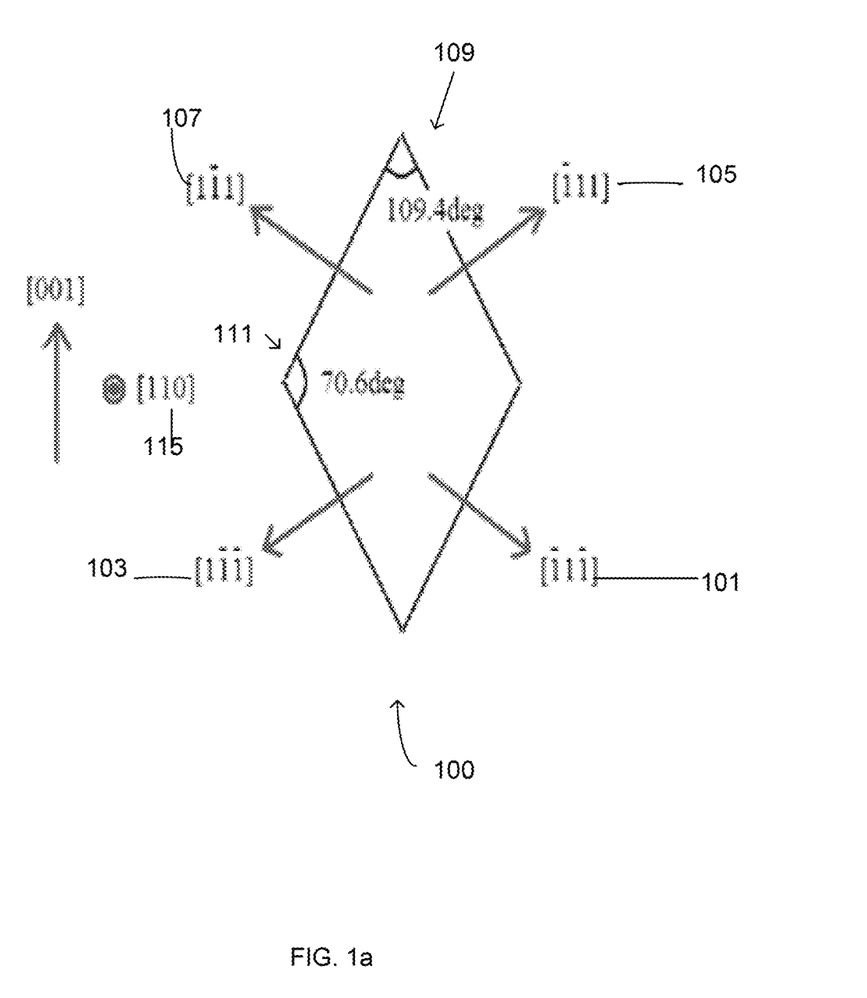
FIGS. 1a-1c represent methods of forming structures according to embodiments.
Figure 1B:
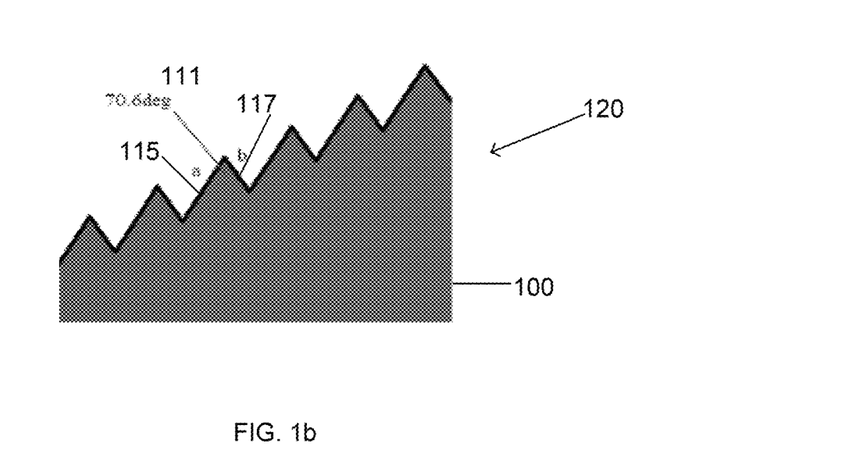
Figure 1C:
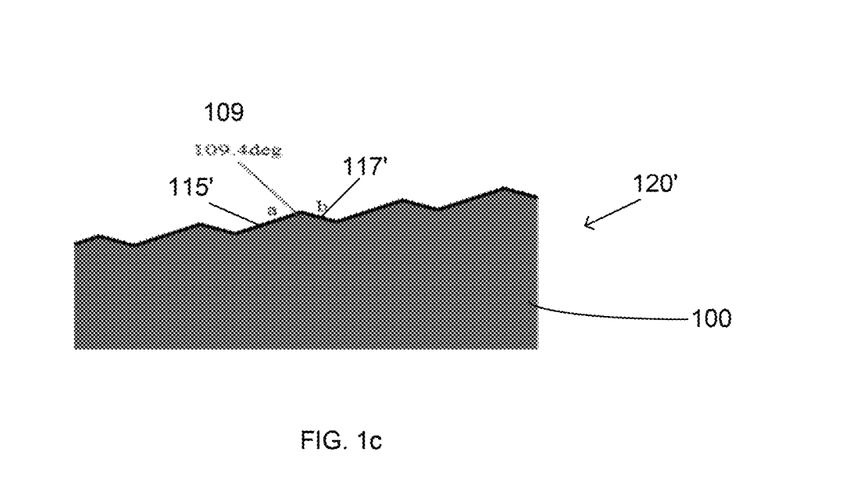

FIGS. 1a-1c illustrate embodiments of forming microelectronic structures, such as diffraction grating structures, for example. FIG. 1a illustrates various crystal axes of a portion of a (110) substrate 100. In one embodiment, the portion of the substrate 100 may comprise a portion of (110) silicon substrate 100. In other embodiments, the (110) substrate 100 may comprise a portion of a (110) single crystal silicon wafer substrate 100, for example. In an embodiment, a [110] direction 115 of the (110) silicon substrate 100 may be perpendicular to the plane of the (110) substrate 100, and may be in an upward direction relative to the plane of the (110) substrate 100 in an embodiment. The (110) substrate 100 may comprise four symmetrical crystallographic planes {111}, and may include a (-11-1) plane 101, a (1-1-1) plane 103, a (-111) plane 105, and a (1-11) plane 107. These crystallographic planes may intersect each other at an angle of either 70.6 degrees 111 or 109.4 degrees 109.

In an embodiment, the (110) substrate 100 may be used to fabricate an on-chip DG, wherein the grooves of the DG may be formed by etching the grooves into the substrate itself, by using a wet etchant, for example. In an embodiment, a crystallographic etchant may be applied to the (110) substrate 100. For example, wet etchants such as but not limited to KOH (potassium hydroxide), EDP (ethylene diamene pyrocatechol), TMAH (tetramethylammoniumhydroxide), or NH4OH (ammonium hydroxide) may be applied to the (110) substrate 100.

Upon application of the wet etchant to the (110) substrate 100, the {111} planes of the (110) substrate 100 form an etch-stop because of the high atomic density in the <111> directions. In an embodiment, the wet etchant may perform an anisotropic etch, which may be slower in the planes of the {111} silicon substrate 100 and create vertical sidewalls. In an embodiment, by utilizing an appropriately designed photomask pattern, such as by using a photomask comprising a periodic array of parallelograms, a sawtooth grating structure with perfectly-smooth vertical sidewalls can be crystallographically wet-etched into the substrate 100. In an embodiment, a groove shaped diffraction grating may be formed/etched into the substrate 100, which may comprise a plane DG in some cases, such as an Echelle grating structure for example.

In an embodiment, diffraction grating structures formed by the etching process can be categorized into two cases: a grating structure 120 with a 70.6 degree angle 111 between arms (FIG. 1b) and another grating structure 120' with a 109.4 degree 109 angle between arms (FIG. 1c). In an embodiment, the blazed angles 111, 109 of the diffraction grating structures 120, 120' can be controlled by adjusting the lengths of arms 115, 115' and 117, 117' in FIGS. 1b-1c. In an embodiment, the angles 111 and 109 of the gratings 120, 120' may be between the arms 115, 117 and 115', 117' respectively. In an embodiment, the arms 115, 115' and 117, 117' of the diffraction grating structures 120, 120' may comprise a sawtooth structure.

In an embodiment, the diffraction grating structures 120, 120' depicted in FIGS. 1b-1c may be used as a reflection grating, wherein a metal/reflective coating may be formed on the vertical sidewalls of the sawteeth structures of the diffraction grating structures 120, 120' and/or an incident angle larger than the total-internal reflection angle can be used with the diffraction gratings 120, 120', wherein the transmission loss of the diffraction grating structures 120, 120' may be significantly reduced.

Figure 2A:
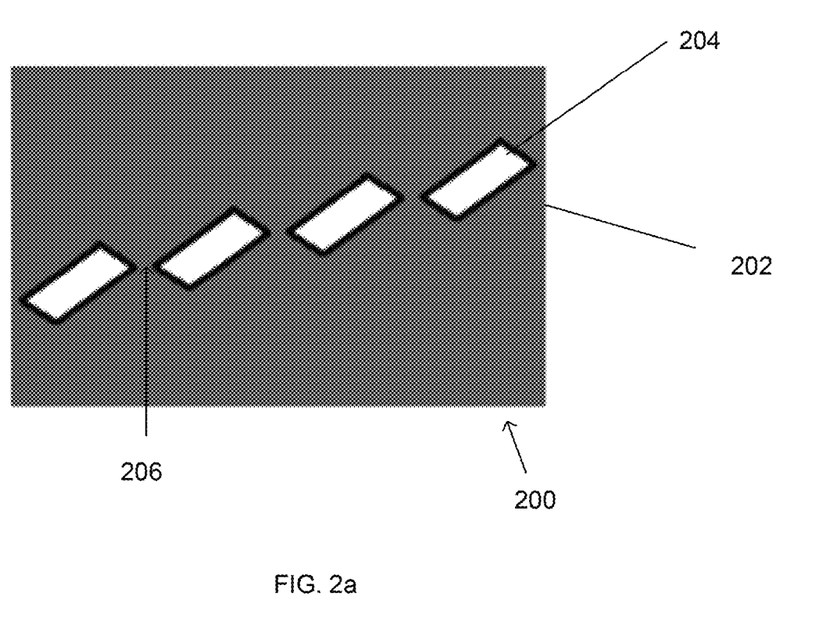
FIGS. 2a-2e represent methods of forming structures according to embodiments.

The preparation of a photomask pattern is important for the formation of the diffraction grating structures 120, 120' depicted in FIGS. 1b-1c. For example, the arm lengths 115, 115' and 117, 117' of FIGS. 1a-1b may be adjusted by the design of the photomask, and thus the angles 111, 109 of the diffraction grating structures 120, 120' may be controlled. In an embodiment, a photomask 202 may be formed on a (110) substrate 200 (similar to the substrate 100 of FIG. 1a), wherein the photomask 202 may comprise a periodic array of parallelograms 204 (FIG. 2a).

Figure 2B:
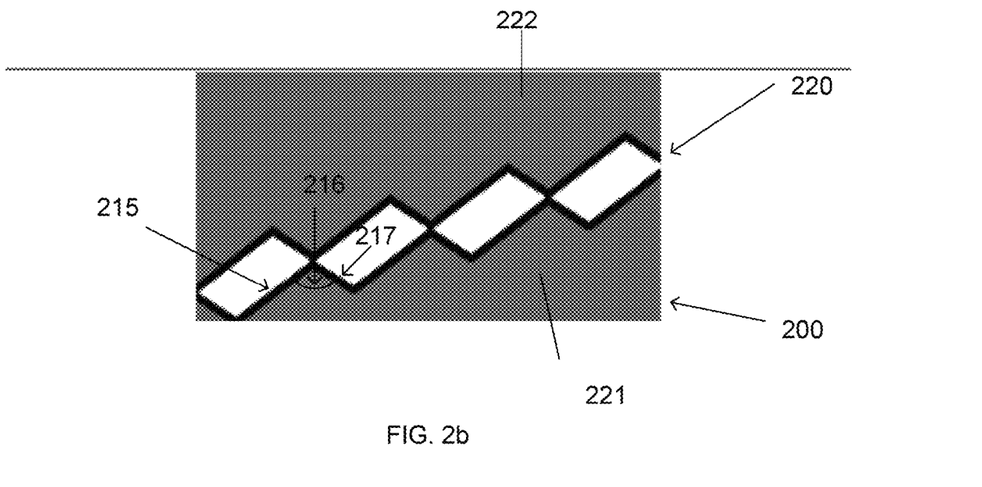

In an embodiment, there may be a gap 206 between individual parallelograms of the parallelogram array 204 of the photomask 202. In an embodiment, a timed etch process may be performed on the photomasked substrate 200, utilizing a wet etch chemical, such as but not limited to one of the wet etch chemicals described previously herein to form a diffraction grating 220 (FIG. 2b). The diffraction grating 220 may comprise arm lengths 215, 217 and an angle 216 between the arms 215, 217, wherein the arm lengths may be defined the photomask 202 design.

Figure 2C:
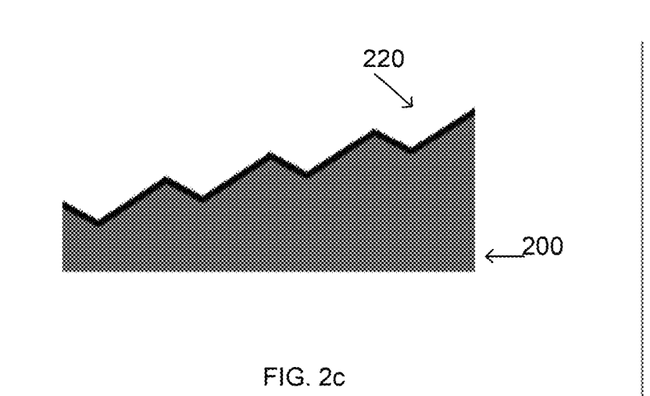

In an embodiment, the diffraction grating structure 220 may comprise a first side 221 and a second side 222. In an embodiment, the second side 222 of the etched diffraction grating structure 220 may be removed, using a dry-etch process for example, but a wet etch may be used in other cases (FIG. 2c). In another embodiment, the first side 221 may be removed from the diffraction grating structure 220. Removal of either the first or second sides 221, 222 of the diffraction grating structure 220 may be desired for applications wherein a light source may be incoming incident from the ambient air, such as when the diffraction grating structure 220 may be utilized in free space optical systems.

Figure 2D:
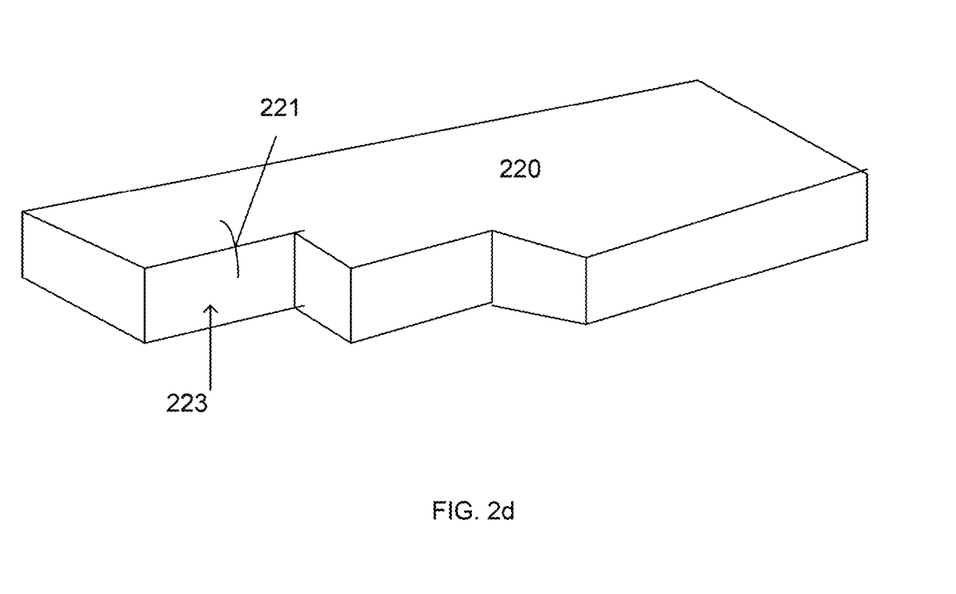

The diffraction grating structure 220 may comprise two major advantages. First, the sidewalls 223 of the diffraction grating structure 220 may be substantially perfectly 90° straight, and may comprise a sidewall angle 221 of about 90 degrees in an embodiment with negligible surface roughness because of the crystallographic wet-etch (FIG. 2d). Such an advantage is especially significant for creating a large active area, such as when a very deep etch depth is required. Secondly, even in the case when the sharpness of a sawtooth structure (adjacent arms with an angle between) on the photomask cannot be defined perfectly, the resultant etched corner will nevertheless be extremely sharp. Such an advantage is especially significant when a high groove density is used, such as when the corner feature size is comparable to or smaller than the lithography resolution.

Figure 2E:
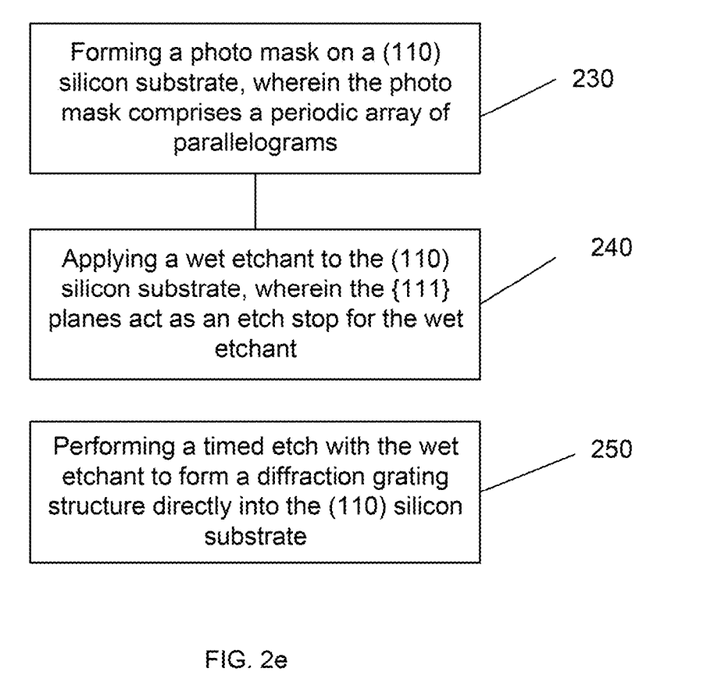

FIG. 2e depicts a flow chart of an embodiment. At step 230, a photo mask may be formed on a (110) silicon substrate, wherein the photo mask comprises a periodic array of parallelograms. At step 240, a wet etchant may be applied to the (110) silicon substrate, wherein the {111} planes act as an etch stop for the wet etchant. At step 250, a timed etch may be performed with the wet etchant to form a diffraction grating structure directly into the (110) silicon substrate.

Prior art large area DGs are routinely fabricated by either mechanically burnishing the grooves onto a substrate, or by reactive ion-beam etching a holographic pattern developed by two-beam interference, for example. When integrating with waveguide-based optoelectronics, diffraction gratings, such as Echelle gratings, for example, are commonly used and fabricated by standard photolithography along with dry-etch. Such prior art approaches will result in undesired properties such as rough surface, slanted sidewalls and blunt corners, which may seriously degrade the diffraction grating device optical quality. Because the grooves of the prior art diffraction grating/waveguides are prepared by dry-etch techniques, where rough surfaces, slanted sidewalls and blunt corners typically occur, such prior art waveguides typically exhibit higher-than-expected insertion loss, especially for 10 micron to 30 micron large-core waveguides.

Benefits of the diffraction grating structure 220 include enabling the formation of on chip-plane DGs, wherein the crystallographic wet-etching of a (110) silicon wafer can define plane DGs with ultra high optical quality. Wet-etching of the (110) silicon substrate enables the fabrication of a 90° straight sidewall for the plane DG of the various embodiments herein. Thus the formation of plane DGs with straight and smooth sidewalls are enabled. For example, Echelle gratings for use in coarse-wave length division multiplexing (CWDM) applications may be formed according to the various embodiments included herein. Because the grooves are prepared by wet-etch techniques, DGs of the various embodiments exhibit lower insertion loss, especially for 10 micron to 30 micron large-core waveguides, thus enabling the fabrication of ideal Echelle gratings. Such grating structures will largely increase the total link budget, since a major loss of silicon photonics link comes from multiplexer and demultiplexer components.

Figure 3:
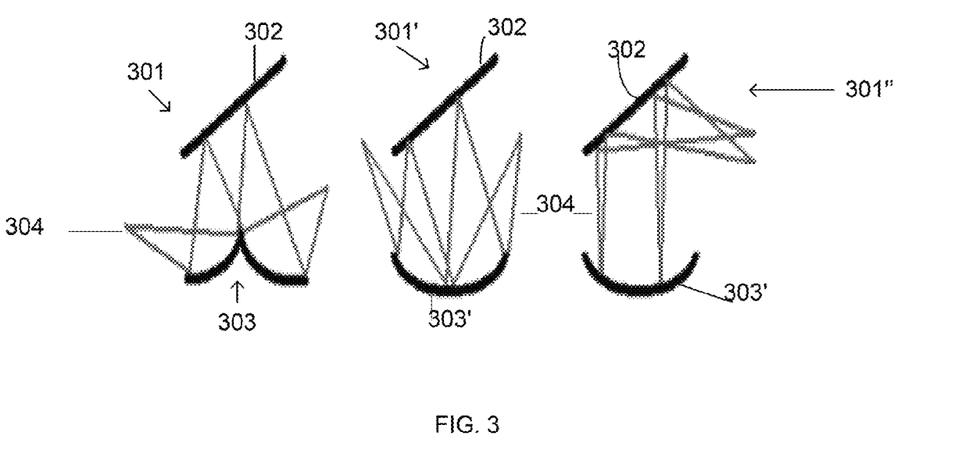
FIG. 3 represents structures according to embodiments.

In an embodiment, on-chip collimators may be incorporated with the DGs of the various embodiments to perform wavelength selection in plane DG based multiplexer/demultiplexer devices. For example, a Czerny-Turner configuration (2 collimators) or a Fastie-Ebert configuration (1 collimator) may be employed, as shown in FIG. 3 showing ray trajectories 304. FIG. 3 depicts a Czerny-Turner configuration 301, comprising a DG 302 fabricated according to the embodiments herein and two collimators 303. A Fastie-Ebert configuration 301' comprising a DG 302 fabricated according to the embodiments herein is depicted with a single collimator 303'. A Fastie-Ebert configuration comprising a DG 302 fabricated according to the embodiments herein is depicted with a single collimator 303' with a Littrow setting 301".

Figure 4A:
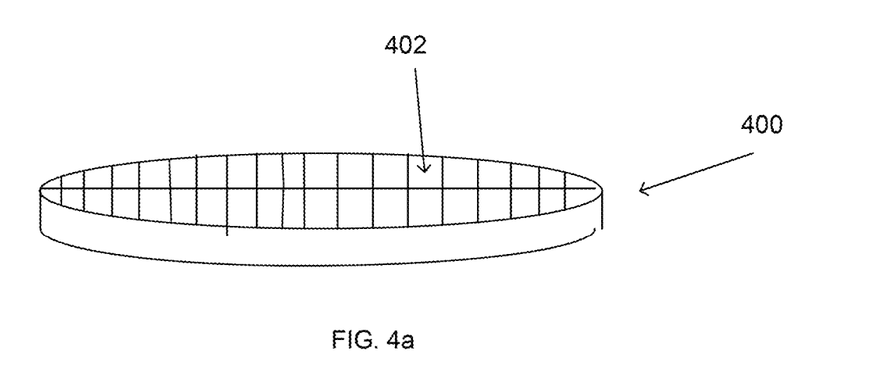
FIGS. 4a-4b represent structures according to embodiments.
Figure 4B:
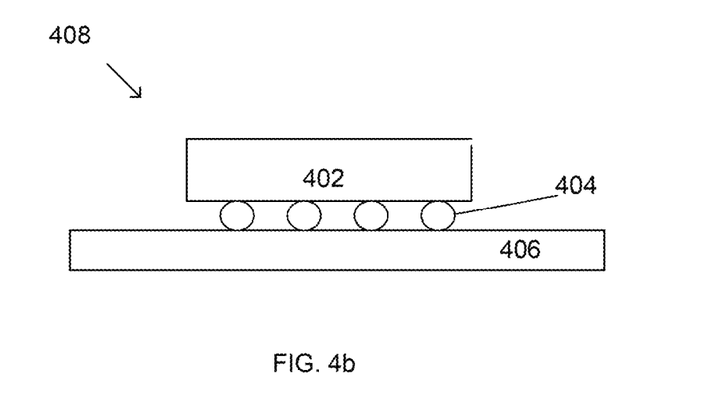

In an embodiment, DG structures of the various embodiments herein may be formed on a silicon wafer 400 as illustrated in FIG. 4a, and may comprise portions of individual integrated circuits on dies 402. The silicon wafer 400 may be cut to separate the individual dies 402 from each other, as is known in the art. The individual dies 402 comprising the DG structure, such as the DG structures of FIGS. 1b, 1c and 2c, for example, may then become part of a microelectronic package assembly 408 (FIG. 4b). The package assembly 408 may comprise a die 402 placed on a package substrate 406 with solder balls 404, in some embodiments, but may comprise any type of package according to the particular application.

Figure 5:
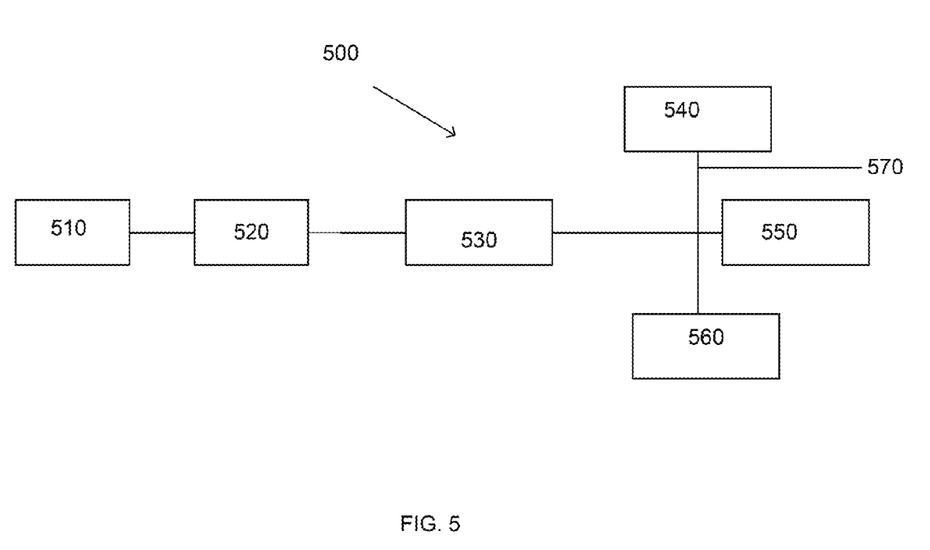
FIG. 5 represents a system according to embodiments.

FIG. 5 depicts a system according to an embodiment. System 500 includes a light source 510, such as a laser, for example, that may direct an input optical beam into an optical diffraction grating structure 520, such as the diffraction grating structures of FIGS. 1b, 1c and 2c, for example. The optical grating structures 520 may be communicatively coupled to a receiver 530 that may comprise an optical receiver 530. The receiver 530 may be coupled to a processor 550, which may be coupled to a memory device 540, an input and output (I/O) controller 560, all of which may be communicatively coupled to each other through a bus 570, in some embodiments. Processor 550 may be a general purpose processor or an application specific integrated circuit (ASIC). I/O controller 560 may include a communication module for wired or wireless communication. Memory device 540 may be a dynamic random access memory (DRAM) device, a static random access memory (SRAM) device, a flash memory device, or a combination of these memory devices. Thus, in some embodiments, memory device 540 in system 500 does not have to include a DRAM device.

One or more of the components shown in system 500 may include one or more diffraction gratings of the various embodiments included herein. For example, processor 550, or memory device 540, or at least a portion of I/O controller 560, or a combination of these components may include in an integrated circuit package that includes at least one embodiment of the structures herein.

These elements perform their conventional functions well known in the art. In particular, memory device 540 may be used in some cases to provide long-term storage for the executable instructions for a method for forming structures in accordance with some embodiments, and in other embodiments may be used to store on a shorter term basis the executable instructions of a method for forming structures in accordance with embodiments during execution by processor 550. In addition, the instructions may be stored, or otherwise associated with, machine accessible mediums communicatively coupled with the system, such as compact disk read only memories (CD-ROMs), digital versatile disks (DVDs), and floppy disks, carrier waves, and/or other propagated signals, for example. In one embodiment, memory device 540 may supply the processor 550 with the executable instructions for execution.

System 500 may include computers (e.g., desktops, laptops, hand-helds, servers, Web appliances, routers, etc.), wireless communication devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Although the foregoing description has specified certain steps and materials that may be used in the embodiments, those skilled in the art will appreciate that many modifications and substitutions may be made. Accordingly, it is intended that all such modifications, alterations, substitutions and additions be considered to fall within the spirit and scope of the embodiments as defined by the appended claims. The Figures provided herein illustrate only portions of exemplary microelectronic structures that pertain to the practice of the embodiments. Thus the embodiments are not limited to the structures described herein.

What is claimed is:

1. A method comprising:
    applying a wet etchant to a plane of a (110) silicon substrate, wherein the (110) silicon substrate comprises a photo mask comprising a periodic array of parallelograms, the plane is perpendicular to a {110} direction of the (110) silicon substrate, and each angle of each of the parallelograms comprises an angle of intersection of {111} crystallographic planes of the silicon substrate; and
    forming a sawtooth diffraction grating structure into the (110) silicon substrate using the wet etchant and photo mask, wherein the {111} planes of the (110) silicon substrate form an etch stop during the etching of the (110) silicon substrate.

2. The method of claim 1 further comprising wherein the diffraction grating structure comprises smooth, vertical sidewalls, wherein the sidewalls are substantially 90 degree sidewalls.

3. The method of claim 1 further comprising wherein the diffraction grating structure comprises an Echelle diffraction grating structure.

4. The method of claim 1 further comprising wherein the diffraction grating comprises a 10 to a 30 micron large core waveguide.

5. The method of claim 1 further comprising wherein the wet etchant comprises one of KOH, TMAH, and NH4OH.

6. The method of claim 1 further comprising wherein the wet etchant performs a crystallographic anisotropic etch on the (110) silicon substrate.

7. The method of claim 1 further comprising wherein forming the diffraction
    grating structure further comprises forming an angle between arms of the diffraction grating structure based on the angles of the parallelograms.

8. The method of claim 7 further comprising wherein the angle between the arms of the diffraction grating structure comprises one of about a 70.6 degree angle and about a 109.4 degree angle.

9. The method of claim 1 further comprising wherein the diffraction grating structure comprises a portion of a coarse-wave length division multiplexing (CWDM) optical system.

10. The method of claim 9 further comprising wherein the CWDM optical system further comprises on-chip collimators.

11. A method of forming a diffraction grating comprising:
    forming a photomask on a plane of a (110) silicon wafer substrate, wherein the photomask comprises a periodic array of parallelogram openings, the photomask is formed perpendicular to a {110} direction of the (110) silicon substrate, and each angle of each of the parallelogram openings comprises an angle of intersection of {111} crystallographic planes of the silicon substrate;
    performing a timed wet etch on the (110) silicon wafer substrate to form a sawtooth diffraction grating structure that is etched into the (110) silicon wafer substrate based on the photomask.

12. The method of claim 11 further comprising wherein corners of adjacent parallelogram openings are not contiguous.

13. The method of claim 11 further comprising wherein a side of the diffraction grating structure is removed, wherein a light source may be applied incident from the ambient air to the diffraction grating structure.

14. The method of claim 11 further comprising wherein a sidewall of the diffraction grating may comprise a reflective coating.

15. The method of claim 11, wherein sidewalls of the diffraction grating structure are substantially perfectly perpendicular to the plane of the silicon substrate and have negligible surface roughness.

16. The method of claim 11, wherein the parallelogram openings form a sawtooth structure of an angle of one of 70.6 degrees and 109.4 degrees.

17. The method of claim 11, wherein sidewalls of the diffraction grating structure are substantially perfectly perpendicular to the plane of the silicon substrate and have negligible surface roughness.

18. A method of preparing a sawtooth diffraction grating structure, the steps comprising:
- applying a wet etchant to a (110) silicon substrate, wherein the (110) silicon substrate comprises a photo mask comprising a periodic array of parallelograms and each angle of each of the parallelograms comprises an angle of intersection of two or more {111} crystallographic planes of the silicon substrate; and
- forming the sawtooth diffraction grating structure into the (110) silicon substrate using the wet etchant and photo mask, wherein the (111) planes of the (110) silicon substrate form an etch stop during the etching of the (110) silicon substrate.

19. The method of claim 18, wherein an angle between adjacent arms of the sawtooth structure comprise an angle of one of 70.6 degrees and 109.4 degrees, and sidewalls of the diffraction grating structure are substantially perfectly perpendicular to the plane of the silicon substrate and have negligible surface roughness.

* * * * *